United States Patent Office 3,636,023
Patented Jan. 18, 1972

3,636,023
THIOBIS PHENOL-NICKEL (II) ALKANOLAMINE COMPLEXES AND USE IN POLYMERS
Robert William Murray, Lebanon, and Joseph Adrian Hoffman, Bridgewater Township, Somerset County, N.J., assignors to American Cyanamid Company, Stamford, Conn.
No Drawing. Filed Aug. 27, 1969, Ser. No. 853,507
Int. Cl. C07f 15/04; C08f 45/62
U.S. Cl. 260—439 R  4 Claims

ABSTRACT OF THE DISCLOSURE

Nickel complexes of alkanolamines and nickel (II) thiobisphenols are provided having the general formula:

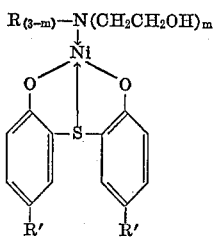

wherein R is hydrogen; alkyl containing from 1 to about 18 carbon atoms including cyclic, acyclic and branched radicals as well as combinations thereof; substituted alkyl containing from 2 to about 36 carbon atoms including cyanoalkyl, alkoxyalkyl, carbalkoxyalkyl, carbamoylalkyl and $R_2N$ alkyl wherein R is as defined herein; aryl containing from about 6 to about 10 carbon atoms; aralkyl containing from about 7 to about 12 carbon atoms, especially mono and bicyclic ar(lower-alkyl); and alkenyl containing from about 2 to about 18 carbon atoms; R' is an alkyl group containing from 1 to about 18 carbon atoms; and m is an integer from 1 to 3.

These complexes are useful as light stabilizers and/or dye receptors in polymeric compositions.

---

This invention relates to new complexes of alkanolamines and nickel (II) thiobisphenols. More particularly, it relates to complexes of alkanolamines and 2,2'-thiobis(p-alkylphenols) exhibiting improved heat stability and to their use as light stabilizers and/or dye receptors for polymers.

U.S. Pat. 3,215,717, issued Nov. 2, 1965, discloses 1:1 nickel amine complexes of phenol sulfides as light stabilizers for polyolefins. U.S. 3,218,294, issued Nov. 16, 1965, discloses the above stabilizers in combination with a hydroxybenzophenone in polyolefins. U.S. Pat. 3,313,770, issued Apr. 11, 1967 discloses polymeric compositions containing these nickel amine complexes.

The above nickel amine complexes, although effective as light stabilizers in polyolefins, impart an undesirable level of color to processed polyolefins such as polypropylene in which they are present as light stabilizers. Since the level of light stability provided by the nickel complexes is quite high, it is an object of this invention to provide nickel complexes which retain the same degree of effectiveness without the disadvantage of imparting color to the stabilized polymers in which they are incorporated. It is another object to provide light stabilizers which can be employed either alone or in combination with ultraviolet absorbers against the degradative effects of ultraviolet light. It is a further object to provide new nickel complexes exhibiting improved heat stability compared to known nickel:thiobisphenol complexes. Other objects of this invention will be apparent from the ensuing description thereof.

The present invention is based on the discovery of a class of 1:1 nickel complexes of alkanolamines and nickel (II) thiobisphenols which are useful as light stabilizers and/or dye receptors in polymeric compositions. The nickel complexes of this invention can be represented by the formula:

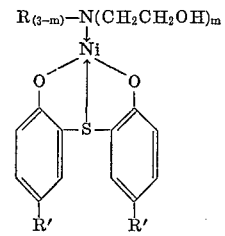

wherein R is hydrogen; alkyl containing from 1 to about 18 carbon atoms including cyclic, acylic and branched radicals as well as combinations thereof; substituted alkyl containing from 2 to about 36 carbon atoms including cyanoalkyl, alkoxyalkyl, carbalkoxyalkyl, carbamoylalkyl and $R_2N$ alkyl wherein R is as defined herein; aryl containing from about 6 to about 10 carbon atoms; aralkyl containing from about 7 to about 12 carbon atoms, especially mono and bicyclic ar(lower alkyl); and alkenyl containing from about 2 to about 18 carbon atoms; R' is an alkyl group containing from 1 to about 18 carbon atoms; and m is an integer from 1 to 3. When m is 1, R can be the same or different.

The new compounds of the present invention are not mixtures of alkanolamines and nickel thiobisphenols but discrete nickel alkanolamine complexes in a definite ratio of 1:1. They are conveniently prepared by heating a nickel complex of a 2,2'-thiobis(p-alkylphenol), preferably as the 1:1 aquo complex with the alkanolamine in an inert organic solvent such as toluene, benzene, chloroform, ether, acetone and the like. The aquo nickel complexes of 2,2'-thiobis(p-alkylphenols) are well known compounds and can be prepared by reacting a 2,2'-thiobis(p-alkylphenol) with a nickel salt such as nickel nitrate in aqueous alcohol using sodium acetate as an acid binder. The 2,2' - thiobis(p-alkylphenols) are well known compounds and may easily be prepared by known means such as by reaction of a p-alkylphenol with sulfur dichloride.

Examples of useful 2,2'-thiobis(p-alkylphenols) are:

2,2'-thiobis(4-octylphenol),
2,2'-thiobis(4-butylphenol),
2,2'-thiobis(4-cyclohexylphenol),
2,2'-thiobis(4-nonylphenol),
2,2'-thiobis(4-ethylphenol),
2,2'-thiobis(4-amylphenol),
2,2'-(4-dodecylphenol) and
2,2'-thiobis(4-octadecylphenol).

In general, it will be observed that any 2,2'-thiobis(p-alkylphenol) with an alkyl group containing from 1 to about 18 carbon atoms can be employed.

A wide variety of alkanolamines can be employed to prepare the complexes of the present invention. Suitable alkanolamines are those represented by the formula:

$$R_{(3-m)}-N(CH_2CH_2OH)_m$$

wherein R is hydrogen; alkyl containing from 1 to about 18 carbon atoms including cyclic, acyclic and branched alkyl radicals as well as combinations thereof; substituted alkyl containing from 2 to about 36 carbon atoms including cyanoalkyl, alkoxyalkyl, carbalkoxyalkyl, carbamoylalkyl and $R_2N$ alkyl wherein R is as defined herein; aryl containing from about 6 to about 10 carbon atoms, aralkyl containing from about 7 to about 12 carbons, especially mono and bicyclic ar(lower alkyl) and alkenyl containing from about 2 to 18 carbon atoms; and $m$ is an integer from 1 to 3. When $m$ is 1, R can be the same or different.

Illustrative of such alkanolamines are ethanolamine,
diethanolamine,
triethanolamine,
N-methyldiethanolamine,
N-ethyldiethanolamine,
N-tert.-butyldiethanolamine,
N-cyclohexyldiethanolamine,
N-cyclohexylethyldiethanolamine,
cyclopentylethyldiethanolamine,
N-phenyldiethanolamine,
N-dodecyldiethanolamine,
N-octadecyldiethanolamine,
N-phenethyldiethanolamine,
N-benzyldiethanolamine,
N-naphthylethylidethanolamine,
N,N-diethylethanolamine,
N,N-dicyclohexylethanolamine,
N-carbethoxyethyl-N,N-bis(hydroxyethyl)amine,
N-cyanoethyl-N,N-bis(hydroxyethyl)amine,
N-methoxyethyl-N,N-bis(hydroxyethyl)amine,
N-dimethylaminoethyl-N,N-bis(hydroxyethyl)amine and the like.

The nickel-alkanolamine complexes of the present invention can be employed to stabilize or impart dye receptivity to a wide variety of polymers. Polyolefins such as polypropylene; polycarbonate; polyamides such as nylon and the like are typical of the polymers which can be so stabilized or rendered dye receptive. The nickel-alkanolamine complexes can be employed in concentrations ranging from about 0.01% to about 5% by weight, preferably from about 0.2% to about 2% based on the weight of the polymer.

These new complexes show superior stabilizing properties in various ways, especially with respect to their heat stability in polymers, they impart very little or no color to the composition, have good compatibility so that fairly high concentrations can be employed without blooming, relatively low volatility so that the agent is retained in the composition without loss and a high degree of light stability so that there is minimal loss due to deterioration of the agent, an effectiveness in preventing or minimizing development of discoloration, brittleness, loss of tensile strength.

In addition, it has been found that the nickel complexes of the present invention can be employed as dye receptors which enable polymeric compositions containing these complexes to be dyed with chelatable dyes such as, for example, those described in U.S. 3,332,732 and U.S. 3,164,438.

The advantages of the new complexes of the invention are particularly apparent when they are used in the substrate in combination with other additives or secondary stabilizers. Ultraviolet light absorbers, for example, can be employed in combination with the light stabilizers of the present invention. Any ultraviolet light absorber can be employed as long as it performs the functions generally required of an ultraviolet light absorber for polymers. These functions are well known to be high absorbancy in the region of about 300–400 millimicrons, low absorbancy in the region above about 400 millimicrons and solubility in and compatibility with polymers as well as stability toward light and heat.

Examples of ultraviolet light absorbers which may be employed are as follows:

2-hydroxybenzophenones such as
2-hydroxy-4-methoxybenzophenone,
2,4-dihydroxybenzophenone,
2,2'-dihydroxy-4-methoxybenzophenone,
2,2',4'-tetrahydroxybenzophenone,
2,2'-dihydroxy-4,4'-dimethoxybenzophenone,
2-hydroxy-4-butoxybenzophenone,
2-hydroxy-4-octyloxybenzophenone,
2-hydroxy-4-dodecyloxybenzophenone,
2,2'-dihydroxy-4-octyloxybenzophenone,
4'-chloro-2-hydroxy-4-octyloxybenzophenone and the like. Other classes of ultraviolet absorbers can similarly be employed such as the benzotriazoles, various alkyl or aryl esters, triazines, benzothiazolines, benzylidene malonic esters, arylaminoethylene guanidines, aryl acrylonitrile and aryl acrylic acid derivatives and the like.

When used in combination with the above UV absorbers, the new nickel complexes enhance the light stability and substantially reduce the color of polymeric compositions. In addition, the new complexes exhibit improved heat stability and color, both initially and after exposure to elevated temperatures. This is particularly important in polymeric fibers since combinations of known nickel complexes, for example, the nickel primary amine complex of thiobisphenols with benzophenone type UV absorbers have heretofore imparted a yellow color to the composition causing problems with shade changes and dyeings. When the light stabilizers of the present invention are used in combination with ultraviolet asborbers, the combined content of these additives can range from about 0.05% to 5% on the weight of polymer. It is considered preferable, however, to use from about 0.1 to 3% by weight. The relative amounts of the stabilizers in the combination can vary from about 1:20 to 20:1 to give improvement over usage of either component alone.

The effectiveness of the nickel complexes of the present invention in polymers can be evaluated in a number of ways. The heat stability of the new complexes can be determined by dry blending with a polymer followed by milling. A milled sheet can then be cut into strips which are then inserted into a Melt Indexer set at 290° C. The extrudate can be removed every minute for ten minutes in order to obtain a color profile for each composition. The discoloration of the extrudates upon aging is given a numerical rating, each number above zero indicating a degree of discoloration:

0—No change
1—Yellow green
2—Tan green
3—Slightly gray green
4—Brown green
5—Gray green
6—Brown
7—Gray
8—Dark brown
9—Black The effectiveness of the nickel alkanolamine complexes of the present invention as light stabilizers in polymers either alone or in combination with ultraviolet absorbers can be determined by incorporation thereof in polymer compositions and exposure to ultraviolet light. The time of exposure before development of a change in carbonyl content of 0.1% can be determined and employed as a measure of the degradation of the polymer.

Typically, 50 g. of a polymer such as polypropylene powder is blended by tumbling with the nickel complex to be tested. The blended mixture is milled on a standard plastic mill at 175° C. A sheet is then compression molded from the milled composition. Specimens for testing in the Xenon Weatherometer are then cut from the molded sheet.

The polymer compositions may contain in addition to the nickel complexes and UV absorbers such other additives as may be needed or desired, for example, hindered phenol antioxidants such as 2,6-di-t-butyl-p-cresol, 2,4,6-tri-t-butylphenol, 3,5-di-t-butyl-4-hydroxyphenylpropionic acid, octadecyl ester and the like, distearyl thiodipropionate, pigments, dyes lubricants and the like.

The invention is further illustrated by the following examples.

EXAMPLE 1

Preparation of 2,2'-thiobis(4-t-octylphenolato) aquo nickel (II)

A solution of 4 parts of 2,2'-thiobis(4-t-octylphenol) and 4 parts $Ni(NO_3)_2 \cdot 6H_2O$ in 100 parts of 95% ethanol is treated with 20 parts sodium acetate dissolved in 50 parts 95% ethanol. The solid product [2,2'-thiobis(4-t-octylphenolato)]aquo nickel (II) is filtered, washed with ethanol and dried.

EXAMPLE 2

Preparation of [2,2'-thiobis(4-t-octylphenolato)] diethanolamine nickel (II)

27.6 g. of the aquo complex prepared in Example 1 was admixed with 5.25 g. of diethanolamine and 200 ml. toluene. The resulting mixture was heated to reflux. The thick aquo colored slurry was diluted with toluene to about 800 ml. and heated with stirring for about 2 hours. The mixture was cooled and filtered, the pale blue-green filter cake washed with toluene and dried. The product turns slightly gray at 185° with decomposition at 321° C. Elemental and infrared analysis was consistent with the formula $C_{32}H_{51}NO_4SNi$.

EXAMPLES 3–8

Preparation of various alkanolamine nickel complexes 27.6 g. of the aqua complex obtained in Example 1 was admixed with several different alkanolamines to obtain the alkanolamine nickel complexes of the present invention. Table I below summarizes each reactant and reactant conditions. It can be seen that the resulting complexes are fairly light colored, thereby imparting little or no color to the resulting polymeric composition.

TABLE I

| Example | Aquo complex Grams | Aquo complex Moles | Alkanolamine | Grams | Mole | Solvent | T,° C. | Time, hrs. | Product color |
|---|---|---|---|---|---|---|---|---|---|
| 3 | 27.6 | 0.053 | Triethanolamine | 7.45 | 0.05 | Toluene | Reflux | 1 | Pale blue. |
| 4 | 27.6 | 0.053 | N-methyldiethanolamine | 6.0 | 0.05 | do | do | 3 | Do. |
| 5 | 27.6 | 0.053 | N-cyclohexyldiethanolamine | 9.4 | 0.05 | do | do | 1.5 | Green. |
| 6 | 27.6 | 0.53 | N-ethy diethanolamine | 6.6 | 0.05 | do | do | 2–3 | Do. |
| 7 | 27.6 | 0.53 | N-phenyldiethanolamine | 9.0 | 0.05 | do | do | 1.5 | Pale green. |
| 8 | 27.6 | 0.53 | N-butyldiethanolamine | 8.0 | 0.05 | do | do | 2 | Do. |

EXAMPLE 9

This example illustrates the improved heat stability imparted to polymeric compositions by the complexes of the present invention.

Samples of polypropylene containing 0.2% 2,4,6-tri-t-butylphenol and 1% by weight of various alkanolamine nickel complexes of the present invention were prepared as follows: The complexes were dry blended with the polypropylene followed by milling. The milled sheet was then cut into strips which were inserted into a Melt Indexer set at 290° C. and an extrudate removed every minute for 10 minutes in order to obtain a color profile for each composition. The discoloration of the extrudates upon aging was given a numerical rating, each number above 0 indicating a degree of discoloration:

0—No change 5—Gray green
1—Yellow green 6—Brown
2—Tan green 7—Gray
3—Slight gray green 8—Dark brown
4—Brown green 9—Black Table II below summarizes the color ratings of the extrudates obtained upon aging at 290° C. The improved heat stability imparted by the complexes of the present invention as compared to the known nickel primary amine complexes of thiobisphenols and the corresponding aquo nickel complex are readily apparent.

TABLE II

| Sample description | Aging at 290° C., color rating of extrudate | | | |
|---|---|---|---|---|
| | 2 min. | 5 min. | 7 min. | 10 min. |
| [2,2'-thiobis(4-t-octylphenolato)]N-dodecylaminoethanol nickel (II) 1.0% | 0 | 0 | 3 | 3 |
| [2,2'-thiobis(4-t-octylphenolato)]ethanolamine nickel (II) 1.0% | 0 | 0 | 2 | 5 |
| [2,2'-thiobis(4-t-octylphenolato)]diethanolamine nickel (II) 1.0% | 0 | 0 | 0 | 2 |
| [2,2'-thiobis(4-t-octylphenolato)]triethanolamine nickel (II) 1.0% | 0 | 0 | 0 | 0 |
| [2,2'-thiobis(4-t-octylphenolato)]N-methyldiethanolamine nickel (II) 1.0% | 0 | 0 | 0 | 0 |
| [2,2'-thiobis(4-t-octylphenolato)]N-ethyldiethanolamine nickel (II) 1.0% | 0 | 0 | 0 | 0 |
| [2,2'-thiobis(4-t-octylphenolato)]N-butyldiethanolamine nickel (II) 1.0% | 0 | 0 | 2 | 5 |
| [2,2'-thiobis(4-t-octylphenolato)]N-cyclohexyldiethanolamine nickel (II) 1.0% | 0 | 0 | 0 | 2 |
| [2,2'-thiobis(4-t-octylphenolato)]N-phenyldiethanolamine nickel (II) 1.0% | 0 | 0 | 0 | 2 |
| [2,2'-thiobis(4-t-octylphenolato)]N,N-diethylethanolamine nickel (II) | 0 | 0 | 1 | 2 |
| [2,2'-thiobis(4-t-octylphenolato)]N,N-dicyclohexylethanolamine nickel (II) | | 1 | 1 | 2 |
| [2,2'-thiobis(4-t-octylphenolato)]-N-butylamine nickel (II) | 0 | 4 | 6 | 8 |
| [2,2'-thiobis(4-t-octylphenolato)] aquo nickel | 1 | 3 | 6 | 8 |

EXAMPLE 10

This example illustrates the improved light stability of polymeric compositions containing the alkanolamine nickel complexes of the present invention.

50 grams of polypropylene powder were blended by tumbling with 1% by weight of an alkanolamine nickel (II) complex of the present invention and 0.2% by weight of 2,4,6-tri-t-butylphenol. The blended mixture was milled on a standard plastic mill at 175° C. From the milled stock, a sheet 5 mils thick was compression molded. Specimens were cut from the 5 mil sheet for testing in the Xenon Weatherometer. Table III below summarizes the data obtained and provides a dramtic comparison of the light stabilizing properties of the alkanolamine nickel complexes of the present invention as compared to a control sample containing no such complex.

TABLE III

| Sample description | Distinguishing ligand | Time (hrs.)[1] |
|---|---|---|
| Control | | 400 |
| [2,2'-thiobis(4-t-octylphenolato)]ethanolamine nickel (II). | Ethanolamine | 1,000 |
| [2,2'-thiobis(4-t-octylphenolato)]N-dodecylaminoethanol nickel (II). | N-dodecyl amino ethanol. | 1,600 |
| [2,2'-thiobis(4-t-octylphenolato)]diethanolamine nickel (II). | Diethanolamine | 1,200 |
| [2,2'-thiobis(4-t-octylphenolato)]triethanolamine nickel (II). | Triethanolamine | 1,400 |
| [2,2'-thiobis(4-t-octylphenolato)]N-methyldiethanolamine nickel (II). | N-methyldiethanolamine. | 1,700 |
| [2,2'-thiobis(4-t-octylphenolato)]N-ethyldiethanolamine nickel (II). | N-ethyldiethanolamine. | 1,900 |
| [2,2'-thiobis(4-t-octylphenolato)]N-butyldiethanolamine nickel (II). | N-butyldiethanolamine. | 1,600 |
| [2,2'-thiobis(4-t-octylphenolato)]N-cyclohexyldiethanolamine nickel (II). | N-cyclohexyldiethanolamine. | 2,600 |
| [2,2'-thiobis(4-t-octylphenolato)]N-phenyldiethanolamine nickel (II). | N-phenyldiethanolamine. | 1,800 |

[1] To percent carbonyl of 0.1, Xenon Weatherometer.

EXAMPLE 11

This example illustrates the improved light stability and color afforded polymeric compositions containing a combination of the nickel alkanolamine complexes and an ultraviolet absorber. For comparative purposes, a similar combination with a nickel primary amine complex of a thiobisphenol is also provided. It can be readily seen that substantial improvements in stability and color are obtained in accordance with the present invention.

Polypropylene blends were prepared by tumbling the following components:

50 grams polypropylene powder
0.1% pentaerythrityltetrakis (3,5-di-t-butyl-4-hydroxyphenylpropionate)
0.25% distearyl 3,3'-thiodipropionate
0.50% 2-hydroxy-4-octyloxybenzophenone
1.0% nickel complex The blended mixture was milled on a standard plastic mill at 175° C. A portion of the milled sheet was cut into strips which were inserted into a Melt Indexer at 290° C. Extrudate was removed every minute for 10 minutes as described in Example 9. The discoloration of the extrudates is given in Table IV using the same numerical rating given in Example 9.

A second portion of the milled sheet was compression molded into films 5 mils thick and exposed in the Xenon Weatherometer. The results shown in Table IV indicate the further improvement in the stabilization of polypropylene afforded by the combination of the nickel complexes of the present invention with the hydroxybenzophenone ultraviolet absorber.

EXAMPLE 12

Preparation of N-carbamoylethyl-N-hydroxyethylamine complex of 2,2'-thiobis(4-t-octylphenol)

The aquo complex of Example 1, 29.1 g. (0.06 mole) was dissolved in 100 ml. of benzene and 10.8 g. (0.6 mole) of 70% 3 - [betahydroxyethyl)amino]propionamide added. The solution became dark green, gradually turning to light green. After five minutes a solid formed and an additional 100 ml. of benzene was added. The solution was refluxed for 2 hours and 100 ml. of benzene added. The green solid was filtered, washed with benzene and dried. There was obtained 38 g. of product.

TABLE IV

| Distinguishing ligand of nickel complex | Aging at 290° C., color rating of extrudate | | | | Time (hrs.)[1] |
|---|---|---|---|---|---|
| | 2 min. | 5 min. | 7 min. | 10 min. | |
| Diethanolamine | 0 | 0 | 2 | 5 | 2,300 |
| N-methyldiethanolamine | 0 | 0 | 0 | 2 | 3,500 |
| Triethanolamine | 0 | 0 | 0 | 0 | 3,200 |
| n-Butylamine | 1 | 3 | 4 | 8 | 3,200 |

[1] Xenon exposure to percent carbonyl of 0.1.

EXAMPLE 13

Preparation of N-aminopropyl-N,N-bis(hydroxyeth) amine complex of 2,2'-thiobis(4-t-octylphenol)

A solution of 25 g. (0.05 mole) of the aquo complex of Example 1 in 150 ml. of toluene was refluxed for 1 hour to remove water azeotropically. The solution was cooled and 8.1 g. (0.05 mole) of 3-aminopropyl diethanolamine was added. The solution was refluxed for 15 minutes and then concentrated to dryness. There was obtained 31 g. (91%) of product which was confirmed by elemental analysis.

What is claimed is:

1. A nickel (II) alkanolamine complex represented by the formula:

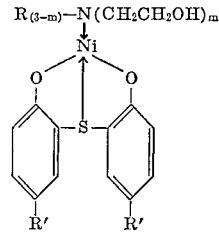

wherein each R is selected from the group consisting of hydrogen; alkyl containing from 1 to about 18 carbon atoms; substituted alkyl containing a total of from 2 to about 36 carbon atoms wherein the substituents are selected from the group consisting of cyano, alkoxy, carbalkoxy, carbamoyl and $R_2N$ wherein R is as defined herein; aryl containing from about 6 to about 10 carbon atoms; aralkyl containing from about 7 to about 12 carbon atoms and alkenyl containing from about 2 to 18 carbon atoms; R' is an alkyl group containing from 1 to about 18 carbon atoms and $m$ is an integer from 1 to 3.

2. The nickel alkanolamine complex of claim 1 wherein the alkanolamine is triethanolamine.

3. The nickel alkanolamine complex of claim 1 wherein the alkanolamine is cyclohexyldiethanolamine.

4. The nickel alkanolamine complex of claim 1 wherein the alkanolamine is phenyldiethanolamine.

References Cited

UNITED STATES PATENTS

| 2,999,872 | 9/1961 | Craig et al. | 260—429 |
| 3,215,717 | 11/1965 | Foster | 260—439 |
| 3,288,748 | 11/1966 | Cyba | 260—45.9 |
| 3,483,160 | 12/1969 | Werber et al. | 260—45.75 |

JAMES E. POER, Primary Examiner

A. P. DEMERS, Assistant Examiner

U.S. Cl. X.R.

8—31, 100, 178 R, 179, 180; 260—45.75 N, 429 D, 429 J

Case 22,961

UNITED STATES PATENT OFFICE
CERTIFICATE OF CORRECTION

Patent No. 3,636,023      Dated January 18, 1972

Inventor(s) Robert William Murray, and Joseph Adrian Hoffman

It is certified that error appears in the above-identified patent and that said Letters Patent are hereby corrected as shown below:

Col. 3, line 24, "N-naphthylethylidethanolamine" should read -- N-naphthylethyldiethanolamine --.

Col. 3, line 36, "polycarbonate" should read -- polycarbonates --.

Col. 5, line 24, "aquo" should read -- aqua --.

Col. 5, line 34, "aqua" should read -- aquo --.

Table II line 28, first col., blank space should read -- 1 --.

Col. 7, line 40, "3 - [betahydroxyethyl)" should read -- 3-[(Betahydroxyethyl) --.

Col. 8, line 1, "(hydroxyeth)" should read -- (hydroxyethyl) --.

Signed and sealed this 6th day of June 1972.

(SEAL)
Attest:

EDWARD M. FLETCHER, JR.      ROBERT GOTTSCHALK
Attesting Officer      Commissioner of Patents